(12) United States Patent
Kita

(10) Patent No.: US 7,359,566 B2
(45) Date of Patent: *Apr. 15, 2008

(54) BRIGHT POINT DETECTING METHOD AND COMPUTER PROGRAM PRODUCT FOR CONDUCTING THE BRIGHT POINT DETECTING METHOD

(75) Inventor: Koji Kita, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 603 days.

This patent is subject to a terminal disclaimer.

(21) Appl. No.: 10/943,961

(22) Filed: Sep. 20, 2004

(65) Prior Publication Data
US 2005/0063606 A1 Mar. 24, 2005

(30) Foreign Application Priority Data
Sep. 19, 2003 (JP) .............................. 2003-328018

(51) Int. Cl.
*G06K 9/40* (2006.01)

(52) U.S. Cl. ........................................ 382/260; 382/274

(58) Field of Classification Search ................ 382/254, 382/260, 305, 312, 173, 225, 274–275, 282, 382/316; 351/212
See application file for complete search history.

(56) References Cited

U.S. PATENT DOCUMENTS 5,548,355 A * 8/1996 Iki .............................. 351/212

FOREIGN PATENT DOCUMENTS

JP 6-030373 A 2/1994

* cited by examiner

*Primary Examiner*—Kanjibhai Patel
(74) *Attorney, Agent, or Firm*—Smith Patent Office

(57) ABSTRACT

A bright point detecting method is provided comprising selecting a cluster of pixels in the image to be processed which are higher in the luminance than a predetermined threshold; counting the number of the pixels of each group along two or more directions and selecting the group of pixels of which the number is not higher than a bright point permissive size of the pixels, calculating the evaluation of each pixel in the cluster with the use of an evaluation function based on the count and identifying the center pixel of the group from the evaluation, and selectively determining as the bright point pixel, the center pixel at the highest evaluation among the center pixels as located in a given area based on the bright point permissive size of the pixels. As a result, a more natural form of the cross filter effect can be applied to any digital image.

12 Claims, 10 Drawing Sheets
(3 of 10 Drawing Sheet(s) Filed in Color)

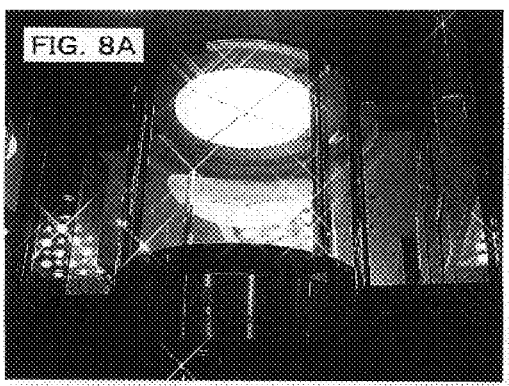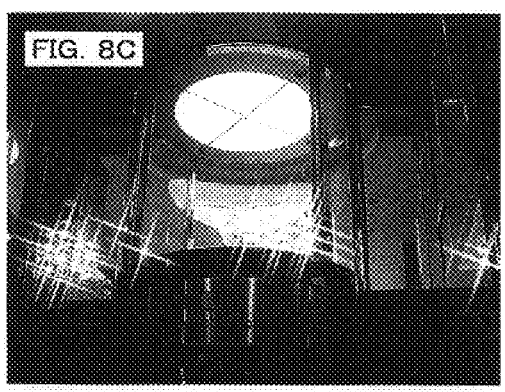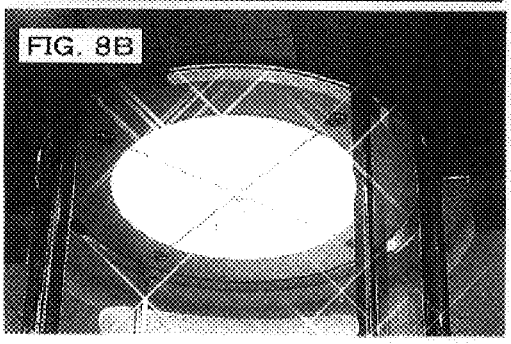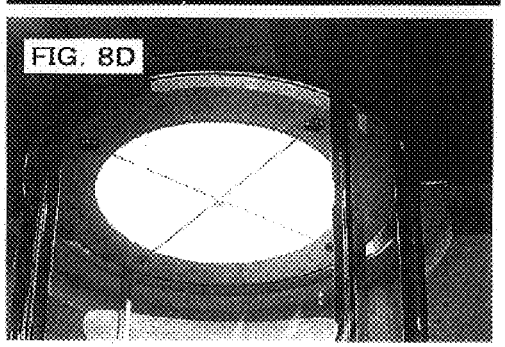

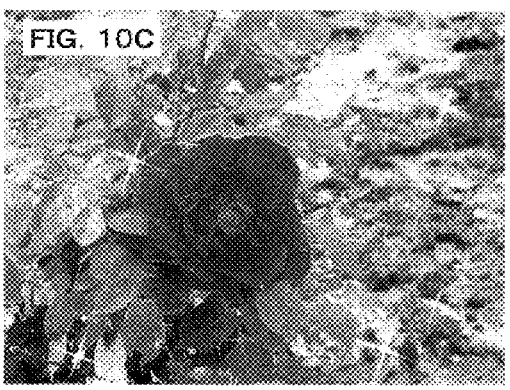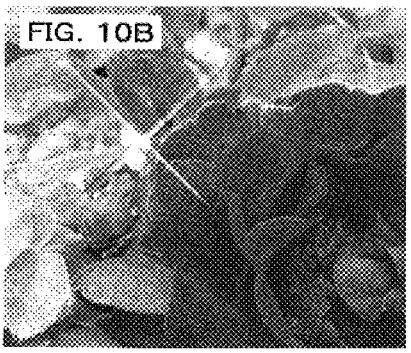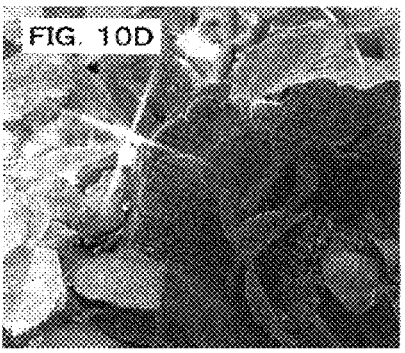

BRIGHT POINT DETECTING METHOD AND COMPUTER PROGRAM PRODUCT FOR CONDUCTING THE BRIGHT POINT DETECTING METHOD

BACKGROUND OF THE INVENTION

1. Field of the Invention

The present invention relates to a bright point detecting method and a computer program product for conducting the bright point detecting method in which a cross filter effect, one of spectacular effect filter, is applied to digital images shot by a digital camera or read by a scanner scanning a photographic film.

2. Description of the Related Art

A cross filter is one type of various spectacular effect filters used with a camera lens unit and implemented by a transparent optic filter with several slits provided in a surface. With the cross filter mounted to a silver halide photographic camera, a resultant photo has a luminous effect where a radial form of bright lines emit from the highlight on a subject to be shot.

The same effect may be obtained with a digital camera using such an optical cross filter. However, the imaging device in the digital camera is smaller in the light receiving area than the film size of a silver halide camera. Accordingly, as the digital camera employs a wide-view lens which is short in the focusing distance and long in the depth of view, it may record the slits in the cross filter when used.

In view of the above aspect, an image processing method is introduced for extracting highlight locations from the image produced by a digital camera and plotting the bright lines extending from each of the highlight locations. The imaging device or CCD in the digital camera is as low as 7 EV in the dynamic range to exposure light as compared with the conventional silver halide cameras. As a common image contains a difference in the luminance greater than the dynamic range, it may develop luminance saturated regions. It is hence difficult to extract the highlight on the subject at a considerable degree of accuracy.

For compensation, a modified digital camera is proposed as disclosed in Japanese Unexamined Patent Publication No. (Heisei)6-30373 which includes a read-in controlling means for, when the subject to be shot has been recorded at an optimum exposure level in a recording medium, reading the subject with its exposure level controlled to be declined by a predetermined step from the optimum exposure level and a record controlling means for detecting each location on the subject read by the read-in controlling means where the luminance is higher than a reference level and recording data of the location on the subject in a given area of the recording medium.

It is still disadvantageous that the optical cross filter on the silver halide camera has to pass a series of trial shooting actions for proving the spectacular effect desired and also its actions require a sort of skill as are not easily conducted by an ordinary personnel. Moreover, the process of eliminating from the image unwanted bright lines which have been recorded at the shooting is a highly intricate task.

It is more practical and functional for producing the cross filter effect to employ an image processing method of detecting a cluster of pixels or bright points in an image which are higher in the luminance than a threshold level and plotting the bright line along the contour of the pixel cluster. It is however difficult for the known image processing method to explicitly discriminate a light emitting object from other whiter objects in the image and detect it as the bright point. If worse, the bright line will appear on an unwanted object in the image. Also, the bright line is substantially linear and may be a chain of white or luminous color. Accordingly, when enlarged in size, the bright line appears in a zigzag form or not properly chained form. It is thus desired to modify the image processing method for producing an improvement of the cross filter effect.

In case that the known image processing method is applied to any type of digital camera which employs none of the mentioned-above function disclosed in the Publication, its unwanted effect will be emphasized because the actual dynamic range of the image has hardly been recorded. It is thus desired to provide an improved image processing method for detecting the bright point at higher accuracy and plotting a more natural form of the bright line.

SUMMARY OF THE INVENTION

The present invention is directed, in view of the above described drawbacks, towards a bright point detecting method and a computer program product for conducting the bright point detecting method where a more natural form of the cross filter effect can be applied to digital images shot by a digital camera or read by a scanner scanning a photographic film.

For achievement of the above object, a bright point detecting method according to the present invention is provided comprising a first step of selecting a cluster of pixels in the image to be processed which are higher in the luminance than the predetermined threshold, a second step of counting the number of the pixels of each group, which continuously extend from one target pixel in the cluster selected by the first step, along two or more directions and selecting the group of pixels of which the number is not higher than a bright point permissive size of the pixels, a third step of calculating the evaluation of each pixel in the cluster, which is selected by the second step, with the use of an evaluation function based on the count and identifying the center pixel of the group from the evaluation, and a fourth step of selectively determining as the bright point pixel the center pixel at the highest of the evaluation among the center pixels which are identified by the third step as located in a predetermined area based on the bright point permissive size of the pixels.

The evaluation function may preferably involve multiplication of a value determined by normalizing the counts, which are calculated along the directions from each target pixel, with a weighted average and releases its result as the evaluation.

The bright point detecting method may further comprise a bright line plotting step of plotting the bright line which extends from the bright point pixel determined by the fourth step. In particular, the bright line plotting step comprises a first bright line plotting step of generating a image of the bright line using a predetermined bright line definition format, a second bright line plotting step of generating data of the bright point pixel, a third bright line plotting step of generating data of each pixel for the bright line from the pixel data produced by attenuating the data of the bright point pixel at a predetermined attenuation rate along the lengthwise and widthwise directions of the bright line and the pixel data of the image to be processed, and a fourth bright line plotting step of plotting the data of the pixels for the bright line on the image to be processed.

Also, the computer program product according to the present invention is provided which is operated in a computer for conducting the bright point detecting method to plot the bright line on a digital photographic image, comprising a first processing means for selecting a cluster of pixels in the image to be processed which are higher in the luminance than a predetermined threshold, a second processing means for counting the number of the pixels of each group, which continuously extend from one target pixel in the cluster selected by the first processing means, along two or more directions and selecting the group of pixels of which the number is not higher than a bright point permissive size of the pixels, a third processing means for calculating the evaluation of each pixel in the cluster, which is selected by the second processing means, with the use of an evaluation function based on the count and identifying the center pixel of the group from the evaluation, and a fourth processing means for selectively determining as the bright point pixel the center pixel at the highest of the evaluation among the center pixels which are identified by the third processing means as located in the predetermined area based on the bright point permissive size of the pixels.

Other features of the present invention will be apparent from the following description referring to embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 8A is an explanatory view of an image sample produced by a conventional bright point detecting method;

FIG. 8B is an explanatory view of an image sample produced by a conventional bright point detecting method;

FIG. 8C is an explanatory view of an image sample produced by the bright point detecting method of the present invention as compared with FIG. 8A;

FIG. 8D is an explanatory view of an image sample produced by the bright point detecting method of the present invention as compared with FIG. 8B;

FIG. 9A is an explanatory view of an image sample produced by a conventional bright point detecting method;

FIG. 9B is an explanatory view of an image sample produced by a conventional bright point detecting method;

FIG. 9C is an explanatory view of an image sample produced by the bright point detecting method of the present invention as compared with FIG. 9A;

FIG. 9D is an explanatory view of an image sample produced by the bright point detecting method of the present invention as compared with FIG. 9B;

FIG. 10A is an explanatory view of an image sample produced by a conventional bright point detecting method;

FIG. 10B is an explanatory view of an image sample produced by a conventional bright point detecting method;

FIG. 10C is an explanatory view of an image sample produced by the bright point detecting method of the present invention as compared with FIG. 10A; and FIG. 10D is an explanatory view of an image sample produced by the bright point detecting method of the present invention as compared with FIG. 10B.

DETAILED DESCRIPTION OF THE PREFERRED EMBODIMENTS

The bright point detecting method, the computer program product for carrying out the bright point detecting method, and the image processing apparatus in which the computer program product for conducting the bright point detecting method is installed according to the present invention will be described in more detail.

Figure 1:
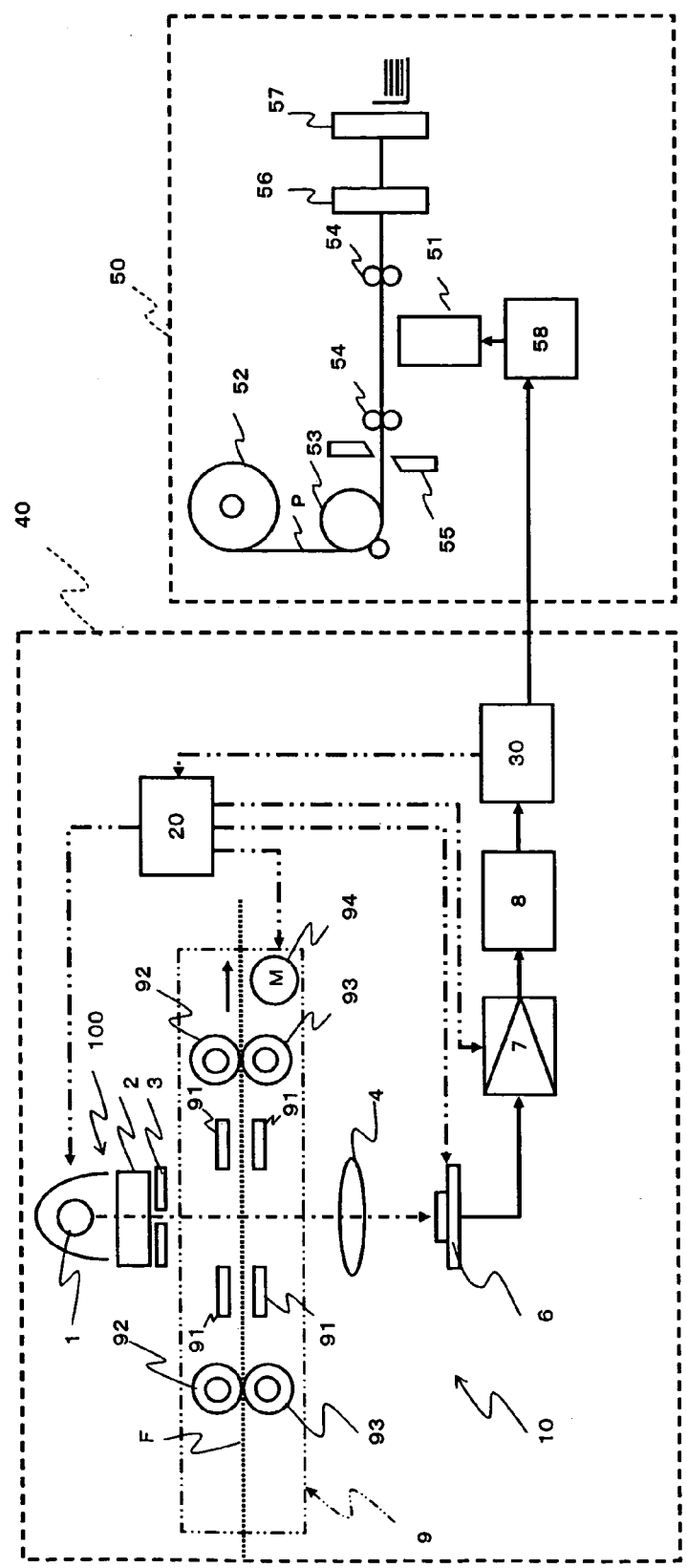
FIG. 1 is a block diagram showing an entire arrangement of an image processor (a photograph processor)

The image processing apparatus according to the present invention is embodied in the form of a photograph processing apparatus which comprises, as shown in FIG. 1, a scanner 10 for optoelectrically reading data of an image recorded on a film, a scanner controller 20 for controlling the action of the scanner 10 for image input, a film image input unit 40 equipped with an image processor 30 for processing the image data read by the scanner 10 with the use of a given algorithm to produce an image data output, and an image output unit 50 for exposing a sheet of printing paper to a projection of the image data output received from the film image input unit 40 and subjecting the sheet on which the image is printed to the developing process to produce a photographic print.

The image output unit 50 comprises a magazine 52 in which a roll of printing paper P is stored, advancing rollers 53 and exposure conveying rollers 54 aligned for conveying the printing paper P from the magazine 52 along a conveying path, a cutter 55 disposed across the conveying path for cutting the printing paper P into sheets of a desired size, an exposure engine 51 disposed across the conveying path for exposing the sheets of the printing paper P to a pattern of laser beam produced in pixels according to the image data received and processed by the film image input unit 40, a developer 56 for subjecting the exposed printing paper P to the developing process, a dryer 57 for drying the developed printing paper P, and a controller 58 for controlling the action of each functional stage illustrated by a block.

More specifically, the scanner 10 comprises a light source 100 for emitting a beam of light for reading an image on a film, which includes a halogen lamp 1, a mirror tunnel 2 for dispersing a flux of light emitted from the halogen lamp 1, and a slit 3 for converting the dispersed light into a slit of light oriented along the direction of a short width of the film F, a focusing lens unit 4 for focusing the slit of light emitted from the slit 3 and passed through the film F, a linear CCD sensor 6 equipped with three light receivers for receiving and reading three, R(red), G(green), and B(blue), color components of the focused light of the image respectively, an amplifying circuit 7 for amplifying a signal output of the linear CCD sensor 6, an A/D converter 8 for sampling and holding a signal output of the amplifying circuit 7 for quantization, and a film carrier 9 for automatically conveying the film.

The film carrier 9 comprises a pair of upper and lower conveying rollers 92 and 93 for conveying the negative film F of APS (Advanced Photo System) or 35-mm standard in a direction denoted by the arrow, a pulse motor 94 for driving the conveying rollers 92 and 93, and a negative film mask 91 for determining the position of the film F.

The scanner controller 20 consists mainly of a CPU for controlling the action of turning on and off the light source 1, the intensity of emitted light, the action of the solid-state imaging device 6, the gain and offset in the amplifying circuit 7, and the action of the film carrier 9 for conveying the film F, ROMs for storing programs for the actions, and RAMs for storing data of the controlling action. Its controlling action determines that the scanning action of the linear CCD sensor 6 reading an image on the film F along the scanning direction with its three R, G, and B light receivers aligned in a row widthwisely of the film F, the action of the film carrier 9 for conveying the film F at a right angle to the alignment of the three light receivers, and the turning on and off of the light source 1.

The action of reading all the images recorded in frames of the film F comprises two steps of pre-scanning to read the images at a low resolution level under the predetermined scanning conditions and main-scanning to read the image areas in the frames at a high resolution level under modified scanning conditions which are determined in response to data of the images recorded by the pre-scanning step.

The image processor 30 consists mainly of a CPU for processing data of the images read by the scanner 10, ROMs for storing the programs for carrying out the image processing, RAMs for storing the data of the images, and other peripheral components. Each step of the action illustrated by a block will now be explained.

Figure 2:
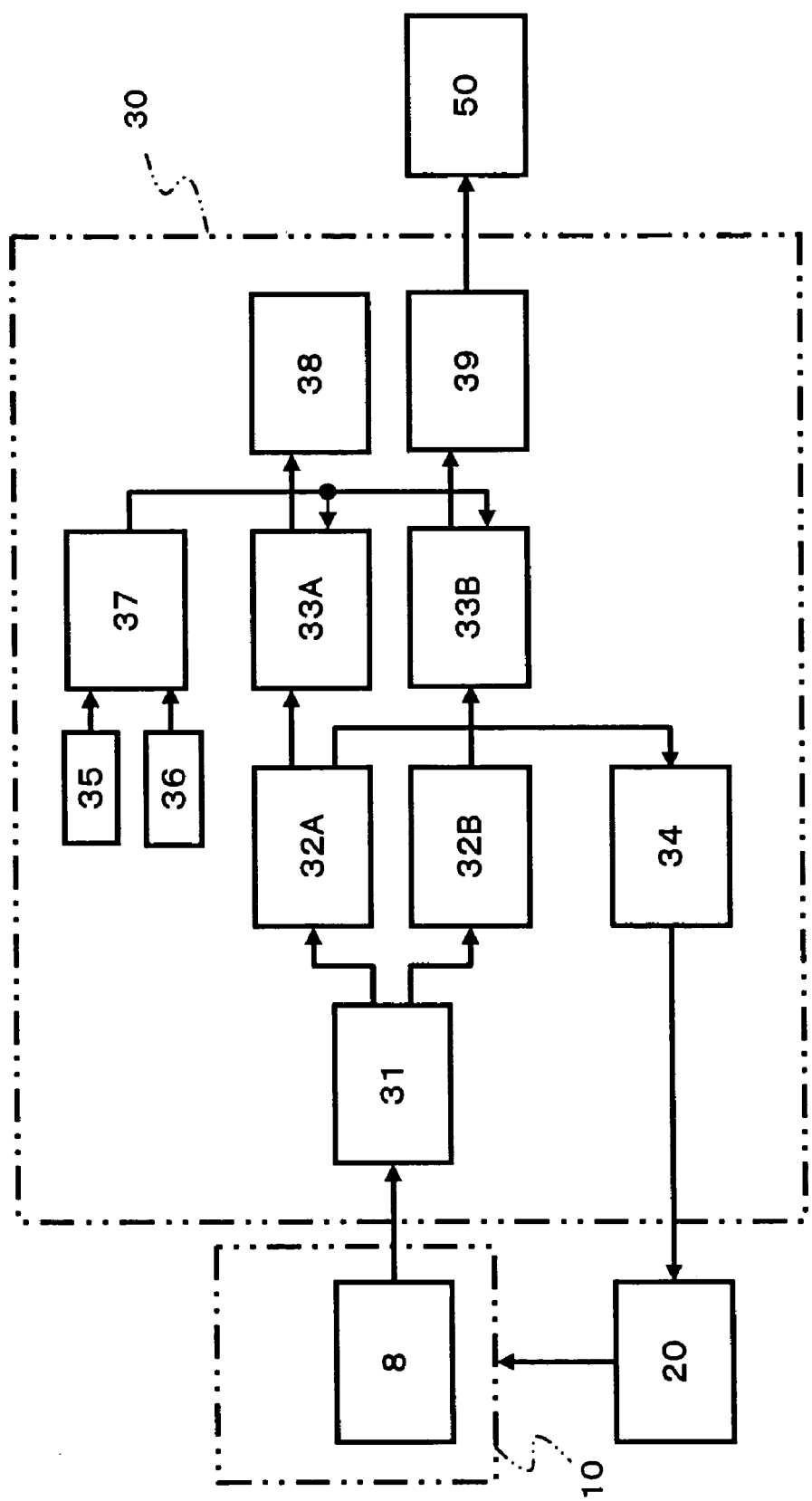
FIG. 2 is a block diagram of an image processing unit.

As shown in FIG. 2, the image processor 30 comprises an input image processor 31 for subjecting the R, G, and B components of each image data received from the scanner 10 to shading correction or the like, a pre-scanned image memory 32A for storing data of the images read by the pre-scanning action of the input image processor 31, a main-scanned image memory 32B for storing data of the images read by the main-scanning action of the input image processor 31, a reading condition determining unit 34 for determining the reading conditions for the pre-scanning and main-scanning action of the scanner 10, which include the resolution level and the gain and offset used in the amplifying circuit 7, a display 38 for displaying the images stored in the pre-scanned image memory 32A, a keyboard 35 and a mouse 36 for entering the image processing conditions for correcting the frame including color balance, color saturation, gradation, concentration, and enlargement and the printing conditions including the number of prints, an image processing condition determining unit 37 for determining the image processing conditions for the image at each frame, an image conversion processing unit 33A for processing data of the pre-scanned image under the conditions determined by the image processing condition determining unit 37, an image conversion processing unit 33B for processing data of the main-scanned image, and an output image processing unit 39 for converting the main-scanned image processed by the image conversion processing unit 33B into a form suited for use in the image output unit 50.

The computer program for conducting the bright point detecting according to the present invention is stored in the ROM of the above image processor 30 and used in response to a command from the CPU for conducting the processing action of the image conversion processing unit 33.

Figure 3:
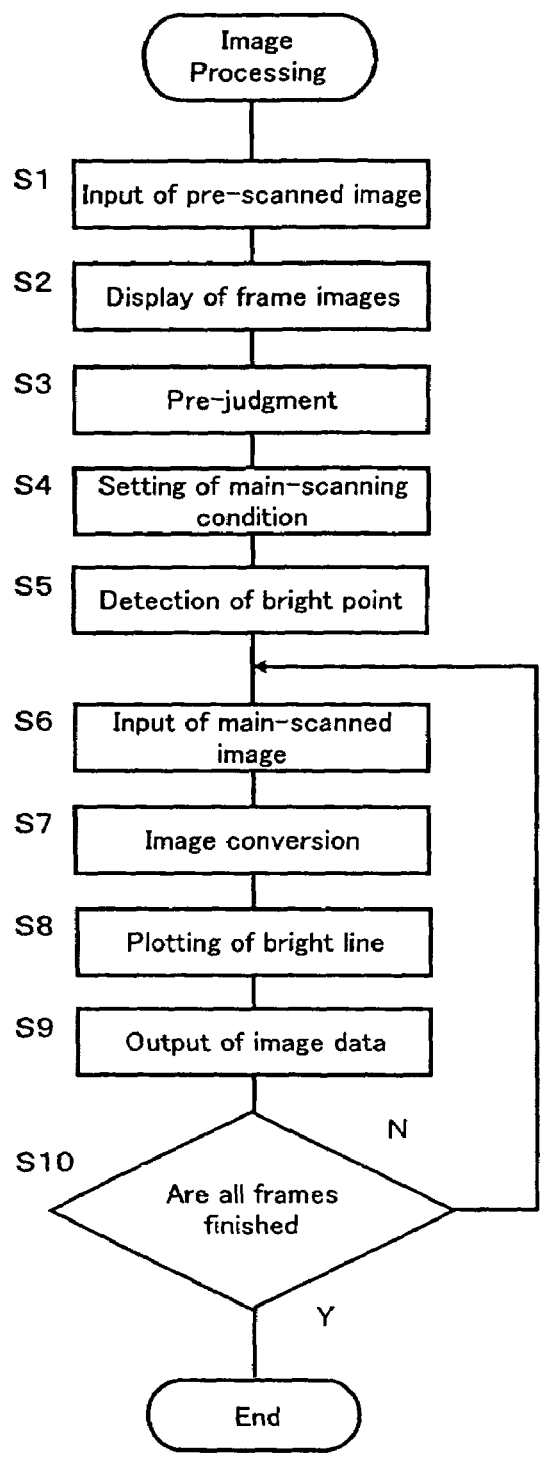
FIG. 3 is a flowchart showing a procedure of photographic image processing.

The image processing action of the image processor 30 will be described referring to the flowchart of FIG. 3. The action starts with the pre-scanned images at a low resolution level received from the scanner 10, subjected to the shading correction or the like, and saved in the pre-scanned image memory 32A (Step S1). Each frame data is separated by the image conversion processing unit 33A from the pre-scanned image data saved in the pre-scanned image memory 32A, subjected to data thinning, and displayed together in the predetermined size with other frames on the display 38 (S2).

This is followed by an action of pre-judging or determining the image processing conditions in the image processing condition determining unit 37 in response to an input data entered by an operator viewing the display 38 and operating the keyboard 35 and/or the mouse 36 before saving the same (S3).

The pre-judging action includes a series of steps of manually correcting the image data of each frame which may have a color inferior since it has automatically been modified with an average of tone throughout all the frames of the film. More particularly, the image processing conditions for correcting the frame including color balance, color saturation, gradation, concentration, and enlargement are determined and entered. The image data of each frame is processed under the image processing conditions by the image conversion processing unit 33A and then displayed on the display 38 as can be viewed by the operator as a final image of quality to be printed.

When the pre-judging action has been completed, the cross filtering process for producing the cross filter effect is selectively initiated by the entry action of the mouse 36 to start a step of detecting the bright points in each frame which will be explained later in more detail. The bright points in each frame of the pre-scanned image of interest are detected and saved in the image processing condition determining unit 37 (S5).

Then, the image input controller 20 starts the main-scanning action of reading the image data in each frame under the reading conditions determined by the reading condition determining unit 40 which include the resolution level at the linear CCD sensor 6 and the gain in the amplifying circuit 6. The image data is subjected to the shading correction or the like and saved in the main-scanned image memory 32B (S6).

Upon retrieved from the memory 32B by the image conversion processing unit 33B, the image data is processed under the image processing conditions determined by the image processing condition determining unit 37 (S7), subjected to the bright line plot processing based on the bright points determined at Step S5 (S8), and converted by the output image processing unit 39 into a form suited for use in the image output unit 50 (S9). When all the frames of the film have been read, processed, and received by the image output unit 50, the procedure of the flowchart is terminated (S10).

Figure 4:
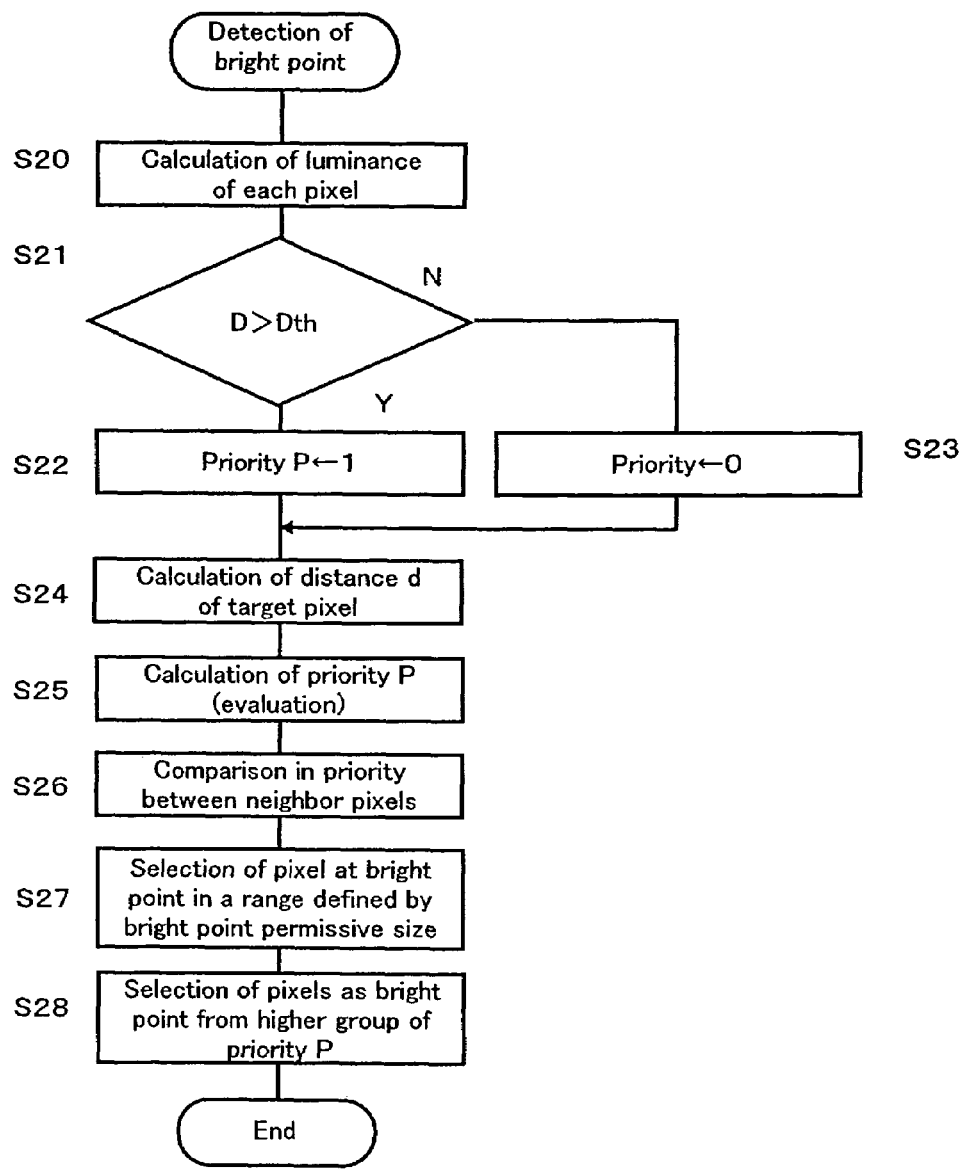
FIG. 4 is a flowchart showing a procedure of detecting the bright point.

The action of detecting the bright points will now be explained referring to the flowchart of FIG. 4. The image conversion processing unit 33A for conducting the action of detecting the bright points which is carried out by the program stored in the ROM as commanded by the CPU comprises a first processing means for selectively determining a cluster of pixels in the image which are higher in the luminance than a given threshold, a second processing means for carrying out in plural directions a counting action of counting the number of selected pixels which are continuous from one target pixel in the cluster of the pixels determined by the first processing means and selectively determining a target group of the selected pixels which extend not to the edge of the image and of which the counted number is not greater than that of the pixels in a bright-point permissive size, a third processing means for calculating an evaluation value of each pixel in the target group selectively determined by the second processing means from the counted number using an evaluation function and identifying the center pixel in the target group from the evaluation value, and a fourth processing means for selectively determining as a pixel at the bright point one of the center pixels, which is highest in the evaluation value, in the bright-point permissive sizes identified by the third processing means.

Figure 5A:
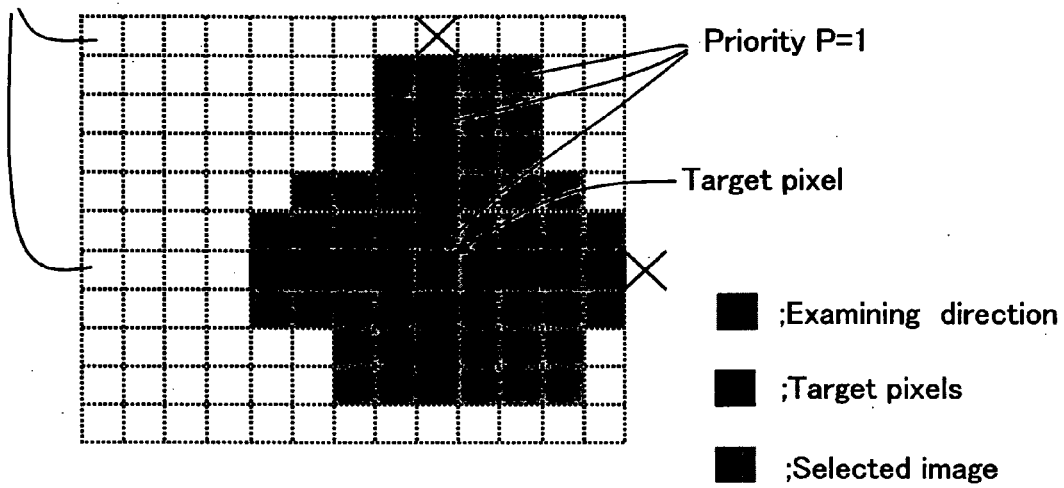
FIG. 5A is an explanatory view of a second layer.
Figure 5B:
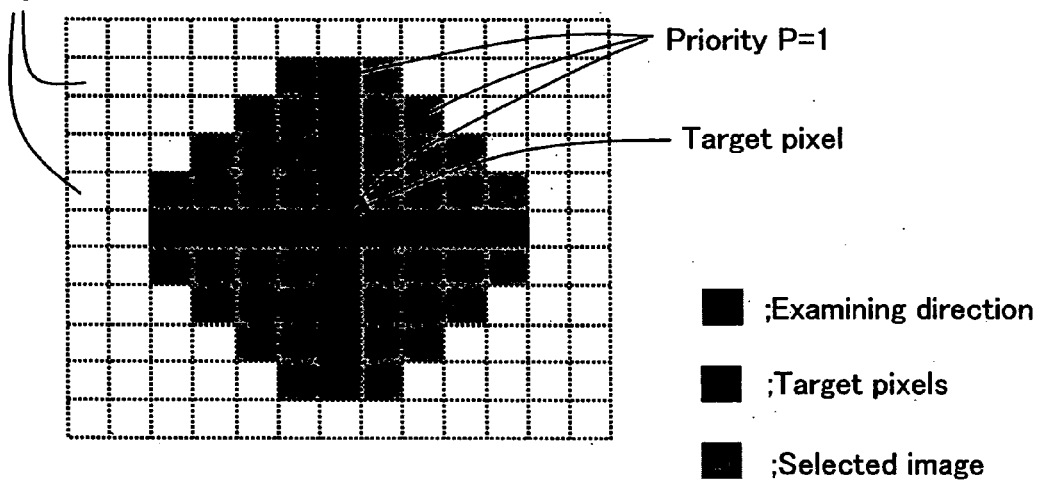
FIG. 5B is an explanatory view of a second layer.

The above action will be explained in more detail. The pre-scanned image memory 32A comprises a first layer where the pre-scanned images are stored and a second layer which is identical in the size to the first layer and carries no data. The first processing means calculates the luminance (density level) Dx,y of each pixel in the image data stored in the first layer using Equation 1 (S20), selectively determines as a candidate of the bright point the pixel of which the luminance is higher than a predetermined threshold Dth (S21), assigns the priority Px,y=1, which is a reference value for evaluation of a pixel, to the location in the second layer corresponding to the pixel selectively determined (S22), and designates the pixel of which the luminance is not higher than the threshold with the priority Px,y=0 (S23). This allows the pixel at the priority of 1 in the second layer to be the selected pixel at the initial stage. The threshold may arbitrarily be determined depending on the type of the image to be processed. Examples of the selected pixel in the second layer are shown in FIGS. 5A and 5B.

$$D_{x,y} = (B_{x,y} + G_{x,y} + R_{x,y})/3 \quad \text{(Equation 1)}$$

where x and y represents a coordinate of the pixel and Bx,y, Gx,y, and Rx,y are three, blue, green, and red, color components in the coordinate (x,y).

The second processing means selectively determines one of the pixels which are at the priority of 1 in the second layer as the target pixel and counts the number of the pixels which extend from the target pixel in the four, upper, lower, leftward, and rightward, directions. Then, the distance d[n] is calculated from the number of the pixels (where n represents the direction, 0 in the positive (upper) direction along the y axis, 1 in the negative (lower) direction along the y axis, 2 in the negative (leftward) direction along the x axis, and 3 in the positive (rightward) direction along the x axis) (S24). The number of the pixels may be counted along oblique directions other than the four, upper, lower, leftward, and rightward, directions.

This is followed by examining all the target pixels to determine the target pixel of which each row of the pixels extends not to the edge of the image and the number of the entire pixels of the cluster is not higher than that of the bright-point permissive size R of the pixels. When the row of the pixels extends to the edge of the image, the distance d[n] is calculated as a negative of the number of the pixels of the row.

The bright-point permissive size R is equal to the number of the pixels in a smaller row extending from the target pixel along the vertical or horizontal within the image, e.g., the number of the pixels at the bright point permissive rate Cp in relation to the total number Y in the vertical row, as defined by Equation 2. The bright-point permissive size R is based on the criteria of judgment that a greater cluster of the pixels represents not the bright point but a bright object (for example, a white wall). In this embodiment, the bright point permissive rate Cp is set to, but not limited to, 50%.

The negative of the number of the pixels of which the row extend to the edge of the image is designated because the pixels in the row are no more calculated and their cluster can hardly be determined in the size. As the cluster of the pixels is eliminated from the examination, this process may be unnecessary. The target pixel adjacent to the edge of the image can be omitted from the calculation as having been judged that it gives a minimum of the effect.

$$R = \min\left(\frac{Y \times Cp/100}{2}, 126\right) \quad \text{(Equation 2)}$$

The division by 2 in Equation 2 means that the sum of a pair of two lengths of the bright line extending from the bright point in opposite, upper and lower or rightward and leftward, directions is within Cp %. The half of the bright line from upper to lower or leftward to rightward is regarded as a limit of the examination, hence defining the bright-point permissive size of the pixels.

As the calculation incorporates an 8-bit process, the limit of the examination is set to 126 in the image of which any row of the pixels is too large (for example, 5040 pixels or more at Cp=50). When the count reaches the limit, the distance d[n] is set simply to 127 for ease of the calculation. However, the setting is not of limitation (as equally applicable to each of the following calculations). For example, whenCp=50 and the bright-point permissive size R of the pixels being 6 in a cluster shown in FIG. 5A, established are d[0]=127, d[1]=4, d[2]=5, and d[3]=−5. In a cluster shown in FIG. 5B, d[0]=d[1]=d[2]=d[3]=5 is established. The target pixel in FIG. 5B is then selected.

The third processing means calculates the priority Px,y as an evaluation from the target pixel selectively determined by the second processing means, using the evaluation function denoted by Equation 3 (S25) and identifies the center pixel from the priority.

$$\text{sum} = \sum_{n=0}^{3} d[n] \quad \text{(Equation 3)}$$

$$avr = \text{sum}/4$$

$$\text{if } (d[n] > avr) \text{then}(wgt_n = avr/d[n]),$$

$$\text{else}(wgt_n = d[n]/avr)$$

$$Px, y = 126(avr/R) \prod_{n=0}^{3} wgt_n$$

More specifically, the evaluation function normalizes the number of the pixels or distance d[n], which has been determined along plural directions on the selected target pixel, with a weighted average avr of the distances and releases its multiplication as the evaluation Px,y. Px,y is then assigned to the pixel in the second layer. The term (avr/R) in the equation is employed for normalization regardless of the size of the cluster about the target pixel. The maximum of (avr/R) is 1.

The term (avr/R) may be omitted if desired. If omitted, the pixel at the priority Px,y ranging from 1 to 126 in the second layer is identified as the target pixel while the pixels at 0, 127, or any negative number are eliminated from the examination of the bright point.

The evaluation of the pixel calculated by the above manner is higher when the cluster of the pixels about the target pixel determined by the second processing means is close to a true circle. In other words, the pixels at the center of the cluster where the selected pixels are continuously aligned are judged at higher evaluation levels. Through comparison between the pixels at the higher evaluations, the center pixel can easily be determined in the cluster of bright point candidate pixels.

Also, a target 3×3 pixel area is examined whether or not any neighbor pixel about the center pixel is higher in the priority Px,y than the center pixel. When so, the priority Px,y of the center pixel is turned to its negative (by multiplying −1) as denoted by Equation 4. This action is repeated throughout the target pixels (S26). More particularly, the target pixel at the highest priority among the neighbor pixels is determined as the center pixel at the bright point. This permits the evaluation of the degree of the circle of the pixels as well as of the size of the cluster.

$$\text{if}(Px,y < |Px+i,y+j|) \text{then}(Px,y \leftarrow Px,y \times (-1)) \quad \text{(Equation 4)}$$

where i,j=−1~1. The absolute value is provided for referring the pixel at the priority turned to a negative value.

The fourth processing means selectively determines as the pixel at the bright point the center pixel at the highest of the priority Px,y among the center pixels, which have been determined by the third processing means, in two or more clusters in a region defined by the bright point permissive size R. The region is sized in 2R×2R. In the region, when the priority Px+i,y+j of the neighbor pixels is smaller than the priority Px,y of the center pixel, they are turned to negative values as denoted by Equation 5. More particularly, the center pixels are examined by their level of the priority Px,y while the neighbor pixels remain not accounted (S27).

$$\text{if}(Px+i,y+j < |Px,y| \text{ and } Px+i,y+j > 0) \text{ then}(Px+i,y+j \leftarrow Px+i,y+j \times (-1)) \quad \text{(Equation 5)}$$

where i,j=−R~R.

As described above, the pixel at the bright point is selectively determined through a series of the steps. In this embodiment, a desired number Cn, determined by the operator, of the pixels at the highest levels of the priority Px,y is selected (S28). This step prevents any bias in the profile of the bright points by, when the Cn is 5 as determined by the operator and the profile of the pixels contains 10 points at the highest levels of the priority, selecting 10 but not 5 of the pixels at the priority equal to the Cn-th highest level of the pixel.

More particularly, as the image processing is executed from one edge, the extraction of five samples involves a half of the bright points or a half of the image and such not spontaneous action has to be avoided. Once the entirety of the image has been scanned, the action will follow the predetermined number after selection of the bright points at the highest of the priority.

Output parameters including the number of the bright points and the luminance of each bright point calculated by Equation 1 are determined from the final pixels at the bright point (xc,xy) and saved as data of the bright points in the image processing condition determining unit 37. The luminance of each bright point is applicable to the bright line which extends from the bright point.

The bright point detecting method according to the present invention comprises the first step of selecting a cluster of pixels in the image to be processed which are higher in the luminance than the predetermined threshold, the second step of counting the number of the pixels of each group, which continuously extend from one target pixel in the cluster selected by the first step, along two or more directions and selecting the group of pixels of which the number is not higher than a bright point permissive size of the pixels, the third step of calculating the evaluation of each pixel in the cluster, which is selected by the second step, with the use of an evaluation function based on the count and identifying the center pixel of the group from the evaluation, and the fourth step of selectively determining as the bright point pixel the center pixel at the highest of the evaluation among the center pixels which are identified by the third step as located in the predetermined area based on the bright point permissive size of the pixels.

More specifically, the action of detecting the bright point in an image to be processed starts with the first step of selecting the pixel at a higher luminance than the threshold as a candidate pixel to be examined. At this step, the pixels selected represent not only light emitting objects having the bright points but also whiter objects.

The second step counts the number of pixels which extend continuously from a target pixel in a cluster of the pixels selected at the first step along two or more directions, for example, the four, upward, downward, leftward, and rightward, directions and selects each cluster of the pixels which is not greater than the bright point permissive size of the pixels and includes the candidate pixel. The bright point permissive size of the pixels is defined as an appropriate size to the image to be processed. This can judge that the cluster of the pixels having a greater number of pixels represents a brighter (whiter) object but not any bright point related object.

The third step calculates from the count the evaluation of the target pixel, selected by the second step, in the cluster which is not greater than the bright point permissive size using a given evaluation function which examines the size of extension of the pixels from the target pixel. Then, the center pixel in the cluster of the pixels including the candidate pixel for the bright point is identified by examining the evaluation of the target pixel.

The fourth step selectively determines as the pixel at the bright point the center pixel at the highest luminance among the center pixels in the predetermined region of the image when two or more of the center pixels have been selected as the candidate pixels for the bright point at the third step.

Figure 6:
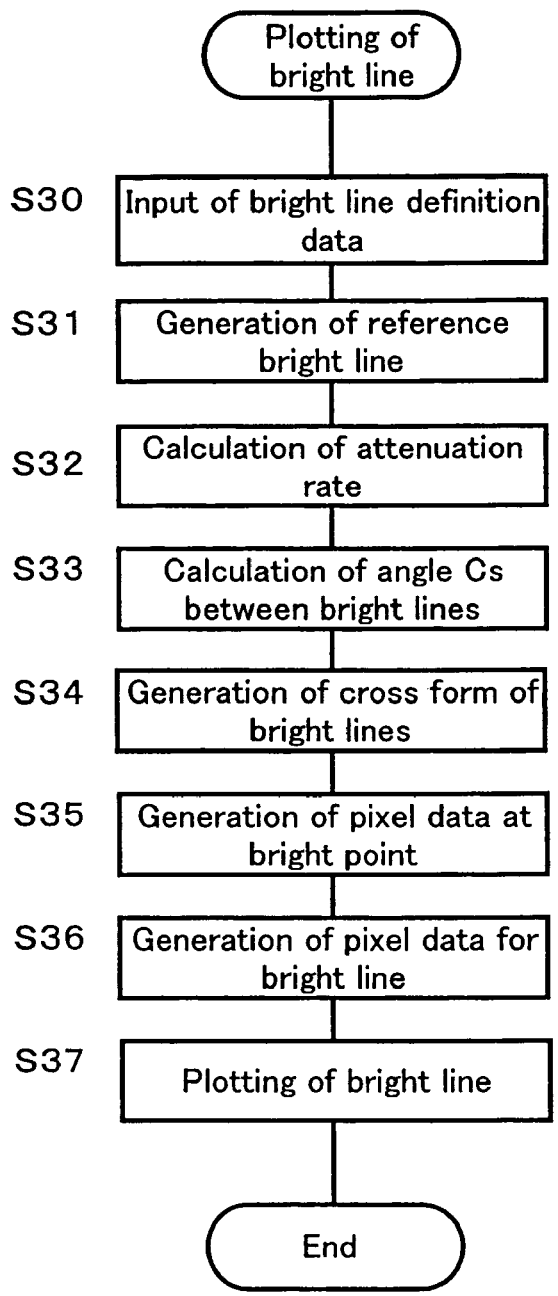
FIG. 6 is a flowchart showing a procedure of plotting the bright line.

Then, the action of plotting the bright line from the pixel at the bright point in relation to the pixels stored in the main-scanned image memory 32B will now be explained referring to the flowchart of FIG. 6.

The image conversion processing unit 33B as a bright line plot processing means for conducting the action of plotting the bright line with the CPU controlled by a program stored in the ROM comprises a first bright line plot processing means for generating an image of the bright line, which extends from the pixel at the bright point, with the use of a predetermined bright line definition format, a second bright line plot processing means for producing data of the pixel at each bright point in the bright line image, a third bright line plot processing means for generating data of the pixels for the bright line from the pixel data, which has been produced by attenuating the data of the pixel at the bright point at a predetermined attenuation rate along the lengthwise and widthwise directions of the bright line, and the pixel data of the image to be processed, and a fourth bright line plot processing means for plotting the data of the bright line on the image to be processed.

The first bright line plot processing means employs an oval format expressed by Equation 6 as the bright line definition format and generates the image of the bright line from the bright line definition data including the long and short axis lengths of an oval to be used, the number of the bright lines, and the angle of starting the bright line which may preferably be entered through the keyboard 35 (S30).

Figure 7A:
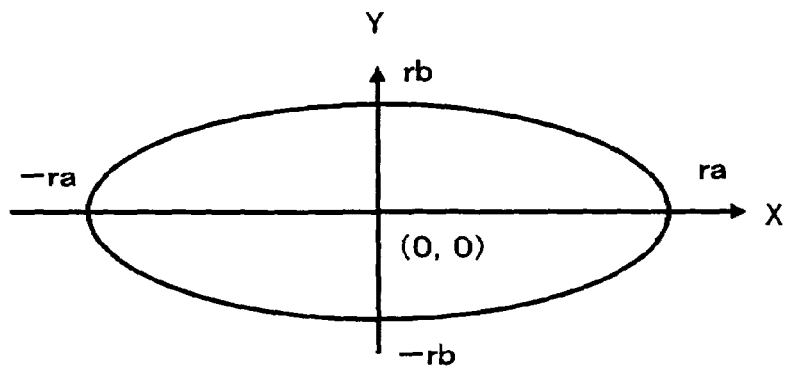
FIG. 7A is an explanatory view of generating a bright line.

The oval format expressed by Equation 6 where the oval has a center at the origin of an XY coordinate with its long axis extending between x=ra and x=−ra and its short axis extending between y=rb and y=−rb as shown in FIG. 7A is shifted to a form denoted by Equation 7. Assuming that a is 1 and the long and short axes are controlled with r and b respectively, the oval is expressed by Equation 8.

$$r^2 = \left(\frac{x^2}{a^2}\right) + \left(\frac{y^2}{b^2}\right) \quad \text{(Equation 6)}$$

$$y = \pm b\sqrt{r^2 - \left(\frac{x^2}{a^2}\right)} \quad \text{(Equation 7)}$$

$$y = \pm b\sqrt{r^2 - x^2} \quad \text{(Equation 8)}$$

where r is an arbitrary value, b is an arbitrary value from zero, and x ranges −r to r.

Figure 7B:
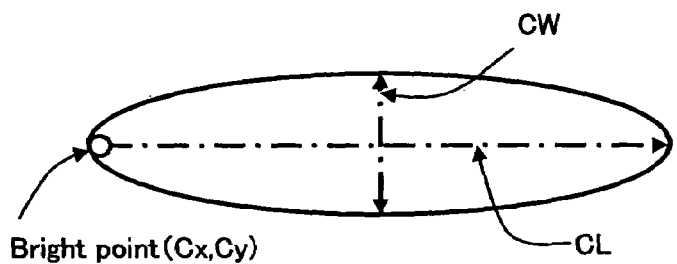
FIG. 7B is an explanatory view of generating a bright line.
Figure 7C:
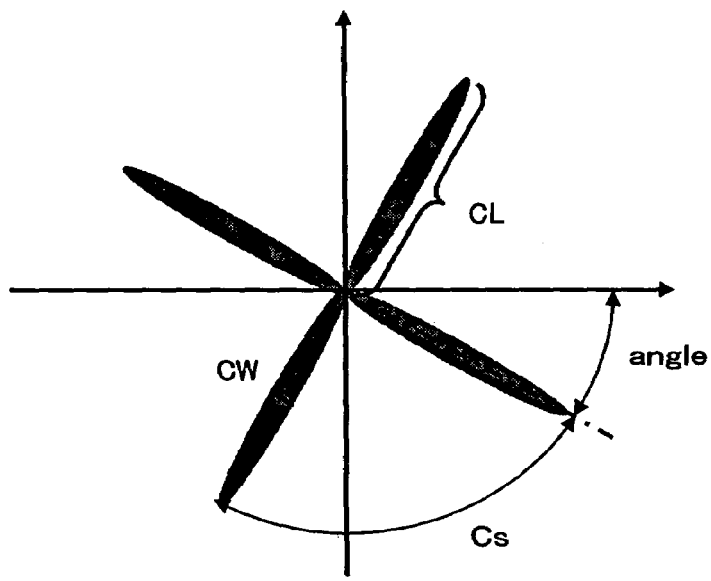
FIG. 7C is an explanatory view of generating a bright line.

As shown in FIGS. 7B and 7C, the oval having the long axis arranged parallel with the x axis is provided as a reference bright line where the lengthwise rate CL determined by the operator is based on 200% of the total number of pixels H so that the bright line extending in opposite directions from the bright point has a length determined shorter than the width of the image to be processed while the widthwise rate CW is varied from 0 to 100. The length L and the width W calculated from the number of pixels are expressed by Equations 9 and 10 respectively. When the widthwise rate CW is 100, the shape is a true circle. Accordingly, Equation 8 is shifted to Equation 11 using the length L and the width W.

$$L(=r) = \frac{H}{2} \times \frac{CL}{100} \quad \text{(Equation 9)}$$

$$W = \frac{CW}{100} \quad \text{(Equation 10)}$$

$$y = \pm W\sqrt{L^2 - x^2} \quad \text{(Equation 11)}$$

where x ranges from −L to L.

Equation 11 denotes an oval of which the center is at the origin. The oval is then shifted using Equation 12 so that the bright point locates at the left end of the long axis as shown in FIG. 7B and tinted throughout the area with a preliminary color data (S31).

$$x2 = x + L \quad \text{(Equation 12)}$$

For producing a natural form of the bright line, the brightness is attenuated as departs from the bright point. This is implemented by determining the attenuation rate G denoted by Equation 13. More specifically, the attenuation rate G1 is determined on the distance d between the bright point (0,0) and a reference point (x2,y2) in the bright line. Then, the attenuation rate G2 along the widthwise direction is calculated with y2 ranging from −y to y. Their product is thus the final attenuation rate G.

$$d = \sqrt{((x2)^2 + (y2)^2)} \quad \text{(Equation 13)}$$

$$G1 = \frac{L - d}{2 \times L} + 0.5$$

-continued $$G2 = \frac{y - |y2|}{y}$$

$$G = G1 \times G2$$

The cross filter effect appears a radially extending pattern of the bright line with the bright point at the center. The angle Cs between any adjacent two of an Cn number of the bright lines throughout 360 degrees about the bright point is determined using Equation 14 (S33). The angle is varied in steps of 0.1 degree.

$$Cs = 3600/Cn \quad \text{(Equation 14)}$$

For producing a desired number of the bright lines determined by Equation 8, the angle from the x axis is calculated as a radian from the start angle Cs of the bright line and the angle Cs between any two adjacent bright lines as denoted by Equation 15. Then, as the coordinate (x2,y2) is turned through the angle (angle), the bright line is shifted to the center coordinate (Xc,Yc) to determine the location (xx',yy') for plotting the bright line (S34). It is noted that xx and yy are divided by 2. Since the bright line is calculated at every 0.5 pixel, any blank in the coloring can be eliminated.

$$\text{angle} = \frac{\left(Ca + \frac{Cs \times (n-1)}{10}\right)\pi}{180} \quad (n = 1, 2, \ldots, Cn) \quad \text{(Equation 15)}$$

$$\begin{pmatrix} xx \\ yy \end{pmatrix} = \begin{pmatrix} \cos(\text{angle}) & -\sin(\text{angle}) \\ \sin(\text{angle}) & \cos(\text{angle}) \end{pmatrix} \begin{pmatrix} x2 \\ y2 \end{pmatrix}$$

$$xx' = Xc + \left(\frac{xx}{2} + 0.5\right)$$

$$yy' = Yc + \left(\frac{yy}{2} + 0.5\right)$$

As described, the image of the bright line is generated and the data of pixels at the bright points are produced by the second bright line plot processing means (S35). When the pixel at the bright point (Cx,Cy) in this main-scan image stored in the main-scanned image memory 32B is expressed by (r,g,b), the luminance D1 is calculated from Equation 16.

$$D1 = (r + g + b)/3 \quad \text{(Equation 16)}$$

The luminance is shifted while the color balancing remains unchanged at the luminance D of the bright point, determined by Equation 1, in the pre-scanned image stored in the image processing condition determining unit 37. The pixel data (rc,gc,bc) and its luminance Dc are calculated using Equation 17. Also, the color of the bright point is determined from Equation 18 with the cross pattern variable Cp (entered by the operator) using the pixel data (rc,gc,bc) or the white pixel data (Dc,Dc,Dc).

$$rc = (r - D1) + D$$

$$gc = (g - D1) + D$$

$$bc = (b - D1) + D$$

$$Dc = (rc + gc + bc)/3 \quad \text{(Equation 17)}$$

$$\text{if } Cp = 0 \text{ then}(rc,gc,bc), \text{else}(Dc,Dc,Dc) \quad \text{(Equation 18)}$$

This is followed by the third bright line plot processing means generating data of the pixels for the bright line from the pixel data produced by attenuating the data of the pixel at the bright point at the attenuation rate along the lengthwise and widthwise directions of the bright line and the pixel data of the image to be processed (S36).

More specifically, the pixel data (ra,ga,ba) is calculated from Equation 19 using the pixel data (ro,go,bo) at the coordinate (xx',yy') determined by Equation 15 and the pixel data (rc,gc,bc) determined by Equation 18 (when the cross pattern variable Cp is zero) at the attenuation rate G determined by Equation 13. When the pixel data (ra,ga,ba) is smaller than the pixel data (ro,go,bo) as denoted by Equation 20, it is determined that the original pixel data is used at each color.

$$ra = rc \times G + ro \times (1-G)$$

$$ga = gc \times G + go \times (1-G)$$

$$ba = bc \times G + bo \times (1-G) \quad \text{(Equation 19)}$$

$$\text{if}(ra < ro) \text{then}(ra = ro), \text{else}(ra)$$

$$\text{if}(ga < go) \text{then}(ga = go), \text{else}(ga)$$

$$\text{if}(ba < bo) \text{then}(ba = bo), \text{else}(ba) \quad \text{(Equation 20)}$$

When the bright lines overlap or the pixel data of the above bright line is generated to cover the existing bright line, the original pixel data (ro,go,bo) for generating the pixel data of the bright line at the above step is replaced by the existing data so that the brightness is enhanced. The fourth bright line plot processing means replaces the pixel data (ra,ga,ba) generated by the third bright line plot processing means with the original pixel data (ro,go,bo) to produce a bright line to be plot (S37).

More particularly, the action of plotting the bright line comprises a first bright line plotting step of generating an image of the bright line, which starts from the pixel at the bright point, using a predetermined bright line definition format, a second bright line plotting step of generating data of the pixel at the bright point, a third bright line plotting step of generating data of the pixels for the bright line from the pixel data produced by attenuating the data of the pixel at the bright point at a given attenuation rate along the lengthwise and widthwise directions of the bright line and the pixel data of the image to be processed, and a fourth bright line plotting step of plotting the data of the bright line on the image to be processed.

Figure 7D:
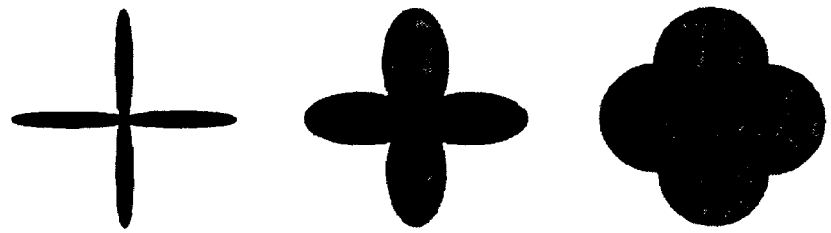
FIG. 7D is an explanatory view showing modifications of the bright line to be generated.

According to the present invention as described above, the bright line can be plotted in a natural form which is gradually declined in the luminance as departing from the bright point and thus highlights the object. Also, as shown at right in FIG. 7D, the soft filter effect in addition to the cross filter effect can be implemented with desired settings of the lengthwise rate CL, the widthwise rate CW, and the number of the bright lines.

In particular, the bright point detecting method is implemented by a computer program product which is stored in the ROM of the image processor 30 and used to operate a first processing means for selecting a cluster of pixels in an image to be processed which are higher in the luminance than a predetermined threshold, a second processing means for counting the number of the pixels of each group which continuously extend from one target pixel in the cluster along two or more directions and selecting the group of pixels of which the number is not higher than a bright point permissive size of the pixels, a third processing means for calculating the evaluation of each pixel with the use of an evaluation function based on the count and identifying the center pixel of the group from the evaluation, a fourth processing means for selectively determining as the bright point pixel the center pixel at the highest of the evaluation among the center pixels located in the predetermined area based on the bright point permissive size of the pixels, and a bright point plot processing means for plotting the bright line which extends from the pixel at the bright point selectively determined by the forth processing means.

The bright point plot processing means implemented by the computer program product comprises the first bright line plot processing means for generating an image of the bright line, which extends from the pixel at the bright point, using a predetermined bright line definition format, the second bright line plot processing means for generating data of the pixel at the bright point, the third bright line plot processing means for generating data of each pixel for the outline of the bright line from the pixel data produced by attenuating the data of the pixel at the bright point at a given attenuation rate along the lengthwise and widthwise directions of the bright line and the pixel data of the image to be processed, and the fourth bright line plot processing means for plotting the data of the pixels for the bright line on the image to be processed.

The conventional bright point detecting method permits the bright lines to be plotted with a large sized lighting instrument undesirably detected having the bright points as shown in FIG. 8A and its enlargement of FIG. 8B. The bright point detecting method of the present invention can however produce a more natural cross filter effect where the bright points are properly identified as shown in FIG. 8C and its enlargement of FIG. 8D. Also, the bright points are unfavorably detected from the face of personnel by the conventional bright point detecting means as shown in FIG. 9A and its enlargement of FIG. 9B. The bright point detecting method of the present invention exhibits a more natural cross filter effect where the bright points are clearly identified as shown in FIG. 9C and its enlargement of FIG. 9D. Moreover, the conventional bright point detecting method produces the bright lines at undesirable level of the luminance as shown in FIG. 10A and its enlargement of FIG. 10B. The method of the present invention can produce a more natural form of the bright line as shown in FIG. 10C and its enlargement of FIG. 10D.

Other embodiments of the present invention will now be described. The previous embodiment allows the output parameters including the number of the bright points and the luminance at the bright points calculated from Equation 1 to be saved as data of the bright point (xc,yx) in the image processing condition determining unit 37 and used together with the lengthwise rate CL of the bright line entered by an operator for carrying out the action of plotting the bright line. Alternatively, the lengthwise rate CL of the bright line determined from the priority P and the luminance D of each bright point may temporarily be saved as one of the output parameters in the image processing condition determining unit 37 and used for conducting the action of plotting the bright line. In the latter case, the lengthwise rate CL of the bright line can be calculated from the luminance of the bright point using Equation 21, where Pmax is the maximum of the priority P, Dth is a threshold of the luminance for detecting the bright point, D is the luminance of the bright point, and Cl is a setting of the ratio of the length of the bright line to the vertical length of the image to be processed, which can be entered by an operator.

$$WL = \frac{D - Dth}{255 - Dth} \quad \text{(Equation 21)}$$

$$CL = \left( \frac{Cl}{100} \times WL \times \left( \frac{P}{2 \times P\max} + 0.5 \right) \right)$$

In the above embodiment, the action of detecting the bright point is applied to images read at low resolution from a photographic film while the action of plotting the bright line is applied to the images read at high resolution from the photographic film. The present invention is not limited to the previous embodiment and may allow both actions of detecting the bright point and plotting the bright line to be applied to images read at high resolution from a photographic film.

While the above embodiment is described with an oval form of the bright line which starts from the bright point, the present invention is not limited to the oval form plotted by starting from the bright point and may be applied to any appropriate shape such as a straight line or a diamond.

Although the above embodiment produces a cross filter effect on images recorded on a photographic film, the present invention may be applied with equal success to digital images shot by a digital camera. In the latter case, the image processor is equipped with an interface circuit for connection with a digital camera or a hand-held memory chip in which images shot by a digital camera are stored to receive data of the images to be processed.

While the above embodiment illustrates a photograph processor as the image processor, its plot processing unit may be a common computer controlled by a known OS program or equipped with a hard disk which is controlled by a known OS program and in which a computer program product for carrying out the action of plotting the bright line is installed.

As set froth above, the present invention provides the bright point detecting method, the computer program product for conducting the bright point detecting method, and the image processing apparatus for detecting the bright point in where a more natural form of the cross filter effect can be applied to the digital images produced by a digital camera or read by the scanner scanning the photographic film or the like.

What is claimed is:

1. A bright point detecting method for plotting a bright line on a digital photographic image, comprising:
   a first step of selecting a cluster of pixels in the image to be processed which are higher in luminance than a predetermined threshold;
   a second step of counting the number of the pixels of each group, which continuously extend from one target pixel in the cluster selected by the first step, along two or more directions and selecting the group of pixels of which the number is not higher than a bright point permissive size of the pixels;
   a third step of calculating the evaluation of each pixel in the cluster, which is selected by the second step, with the use of an evaluation function based on the count and identifying the center pixel of the group from the evaluation; and
   a fourth step of selectively determining as a bright point pixel the center pixel at the highest evaluation among the center pixels which are identified by the third step as located in a given area based on the bright point permissive size of the pixels.

2. The bright point detecting method according to claim 1, wherein the evaluation function involves multiplication of a value determined by normalizing the counts, which are calculated along the directions from each target pixel, with a weighted average and releases its result as the evaluation.

3. The bright point detecting method according to claim 2, wherein the target pixel at a higher level in the luminance than those of the pixels provided adjacent to the target pixel is judged as the center pixel.

4. A bright point detecting method for plotting a bright line on a digital photographic image, comprising:
   a first step of selecting a cluster of pixels in the image to be processed which are higher in luminance than a predetermined threshold;
   a second step of counting the number of the pixels of each group, which continuously extend from one target pixel in the cluster selected by the first step, along two or more directions and selecting the group of pixels of which the number is not higher than a bright point permissive size of the pixels;
   a third step of calculating the evaluation of each pixel in the cluster, which is selected by the second step, with the use of an evaluation function based on the count and identifying the center pixel of the group from the evaluation;
   a fourth step of selectively determining as a bright point pixel the center pixel at the highest evaluation among the center pixels which are identified by the third step as located in a given area based on the bright point permissive size of the pixels; and
   a bright line plotting step of plotting the bright line which extends from the bright point pixel determined by the fourth step, wherein
   the bright line plotting step includes:
   a first bright line plotting step of generating an image of the bright line using a predetermined bright line definition format;
   a second bright line plotting step of generating data of the bright point pixel;
   a third bright line plotting step of generating data of each pixel for the bright line from the pixel data produced by attenuating the data of the bright point pixel at a predetermined attenuation rate along the lengthwise and widthwise directions of the bright line and the pixel data of the image to be processed; and
   a fourth bright line plotting step of plotting the data of the pixels for the bright line on the image to be processed.

5. The bright point detecting method according to claim 4, wherein the bright line definition format involves an oval form which extends from one end of the long axis and the first bright line plotting step includes an input step of entering data for defining the bright line including the long and short axes of the oval, the number of the bright lines, and angle of starting the bright line.

6. The bright point detecting method according to claim 4, wherein the first to fourth steps are applied to an image read at a low level of the resolution from the photographic film while the bright line plotting step is applied to an image read at a high level of the resolution from the photographic film.

7. A computer-readable medium including computer program for conducting the bright point detecting method to plot the bright line on a digital photographic image, comprising:
   a first processing means for selecting a cluster of pixels in the image to be processed which are higher in luminance than a predetermined threshold;

a second processing means for counting the number of the pixels of each group, which continuously extend from one target pixel in the cluster selected by the first processing means, along two or more directions and selecting the group of pixels of which the number is not higher than a bright point permissive size of the pixels;

a third processing means for calculating the evaluation of each pixel in the cluster, which is selected by the second processing means, with the use of an evaluation function based on the count and identifying the center pixel of the group from the evaluation; and a fourth processing means for selectively determining as a bright point pixel the center pixel at the highest evaluation among the center pixels which are identified by the third processing means as located in a predetermined area based on the bright point permissive size of the pixels.

8. The computer-readable medium including computer program according to claim 7, wherein the evaluation function involves multiplication of a value determined by normalizing the counts, which are calculated along the directions from each target pixel, with a weighted average and releases its result as the evaluation.

9. The computer-readable medium including computer program according to claim 8, wherein the target pixel at a higher level in the luminance than those of the pixels provided adjacent to the target pixel is judged as the center pixel.

10. A computer-readable medium including computer program for plotting a bright line on a digital photographic image comprising:

a first processing means for selecting a cluster of pixels in the image to be processed which are higher in luminance than a predetermined threshold;

a second processing means for counting the number of the pixels of each group, which continuously extend from one target pixel in the cluster selected by the first processing means, along two or more directions and selecting the group of pixels of which the number is not higher than a bright point permissive size of the pixels;

a third processing means for calculating the evaluation of each pixel in the cluster, which is selected by the second processing means, with the use of an evaluation function based on the count and identifying the center pixel of the group from the evaluation;

a fourth processing means for selectively determining as a bright point pixel the center pixel at the highest evaluation among the center pixels which are identified by the third processing means as located in a predetermined area based on the bright point permissive size of the pixels; and a bright line plotting means for plotting the bright line which extends from the bright point pixel determined by the fourth processing means, wherein the bright line plotting means includes:

a first bright line plot processing means for generating an image of the bright line using a predetermined bright line definition format;

a second bright line plot processing means for generating data of the bright point pixel;

a third bright line plot processing means for generating data of each pixel for the bright line from the pixel data produced by attenuating the data of the bright point pixel at a predetermined attenuation rate along the lengthwise and widthwise directions of the bright line and the pixel data of the image to be processed; and a fourth bright line plot processing means for plotting the data of the pixels for the bright line on the image to be processed.

11. The computer-readable medium including computer program for plotting the bright line on the digital photographic image according to claim 10, wherein the bright line definition format involves an oval form which extends from one end of the long axis and the first bright line plot processing step includes an input step of entering data for defining the bright line including the long and short axes of the oval, the number of the bright lines, and angle of starting the bright line.

12. An image processing apparatus for plotting the bright line on the digital photographic image, comprising:

a first processing means for selecting a cluster of pixels in the image to be processed which are higher in luminance than a predetermined threshold;

a second processing means for counting the number of the pixels of each group, which continuously extend from one target pixel in the cluster selected by the first processing means, along two or more directions and selecting the group of pixels of which the number is not higher than the bright point permissive size of the pixels;

a third processing means for calculating the evaluation of each pixel in the cluster, which is selected by the second processing means, with the use of an evaluation function based on the count and identifying the center pixel of the group from the evaluation;

a fourth processing means for selectively determining as a bright point pixel the center pixel at the highest evaluation among the center pixels which are identified by the third processing means as located in a predetermined area based on the bright point permissive size of the pixels; and a bright line plotting means for plotting the bright line which extends from the bright point pixel determined by the fourth processing means, wherein the bright line plotting means includes:

a first bright line plot processing means for generating an image of the bright line using a predetermined bright line definition format;

a second bright line plot processing means for generating data of the bright point pixel;

a third bright line plot processing means for generating data of each pixel for the bright line from the pixel data produced by attenuating the data of the bright point pixel at a predetermined attenuation rate along the lengthwise and widthwise directions of the bright line and the pixel data of the image to be processed; and a fourth bright line plot processing means for plotting the data of the pixels for the bright line on the image to be processed.

* * * * *